United States Patent
Gest et al.

(10) Patent No.: US 7,637,102 B2
(45) Date of Patent: Dec. 29, 2009

(54) HYDRAULIC CIRCUIT HAVING A MULTIFUNCTION SELECTOR

(75) Inventors: Eric Gest, Compiegne (FR); Philippe Lucienne, Aumont en Halatte (FR); Jean-Philippe Raisin, Gouvieux (FR)

(73) Assignee: Poclain Hydraulics Industrie, Verberie (FR)

( * ) Notice: Subject to any disclaimer, the term of this patent is extended or adjusted under 35 U.S.C. 154(b) by 289 days.

(21) Appl. No.: 11/632,519

(22) PCT Filed: Jul. 8, 2005

(86) PCT No.: PCT/FR2005/001767

§ 371 (c)(1),
(2), (4) Date: May 9, 2007

(87) PCT Pub. No.: WO2006/016049

PCT Pub. Date: Feb. 16, 2006

(65) Prior Publication Data

US 2008/0047263 A1   Feb. 28, 2008

(30) Foreign Application Priority Data

Jul. 16, 2004   (FR) .................................. 04 07910

(51) Int. Cl.
*F16D 31/02*   (2006.01)

(52) U.S. Cl. ............................... 60/464; 60/394; 60/493

(58) Field of Classification Search .................... 60/394, 60/460, 464, 493; 91/38
See application file for complete search history.

(56) References Cited

U.S. PATENT DOCUMENTS

| 3,846,982 | A  | * | 11/1974 | Rometsch et al. ............. 60/464 |
| 5,197,283 | A  | * | 3/1993  | Kagiwada et al. ............. 60/464 |
| 6,581,378 | B1 | * | 6/2003  | Lebrun ........................ 60/464 |
| 7,150,150 | B2 | * | 12/2006 | Bigo et al. ................... 60/493 |
| 2004/0006981 | A1 | | 1/2004 | Dong et al. |

FOREIGN PATENT DOCUMENTS

| DE | 1 041 754 | 10/1958 |
| DE | 1 249 620 | 9/1967 |
| EP | 1 097 321 | 5/2001 |
| FR | 1395955   | 4/1965 |
| FR | 2 776 032 | 9/1999 |
| JP | 6-249204  | 9/1994 |

* cited by examiner

*Primary Examiner*—Michael Leslie
(74) *Attorney, Agent, or Firm*—Ladas & Parry LLP

(57) ABSTRACT

An open hydraulic circuit comprising a main pump (P), a hydraulic motor (M), two main ducts (10, 12) constituting a feed main duct and a discharge main duct and connected to the pump or to a reservoir (R) via a feed selector (14). The circuit further comprises a multifunction valve device comprising a multifunction selector (20) for connecting the main duct that is at the higher pressure to a pressure limiter (24) and for connecting the main duct that is at the lower pressure to booster means (16), and for interconnecting the main ducts by connecting them to the pressure limiter when the pressures in the main ducts are substantially mutually equal.

16 Claims, 3 Drawing Sheets

HYDRAULIC CIRCUIT HAVING A MULTIFUNCTION SELECTOR

CROSS-REFERENCE TO RELATED APPLICATIONS

Figure 1:
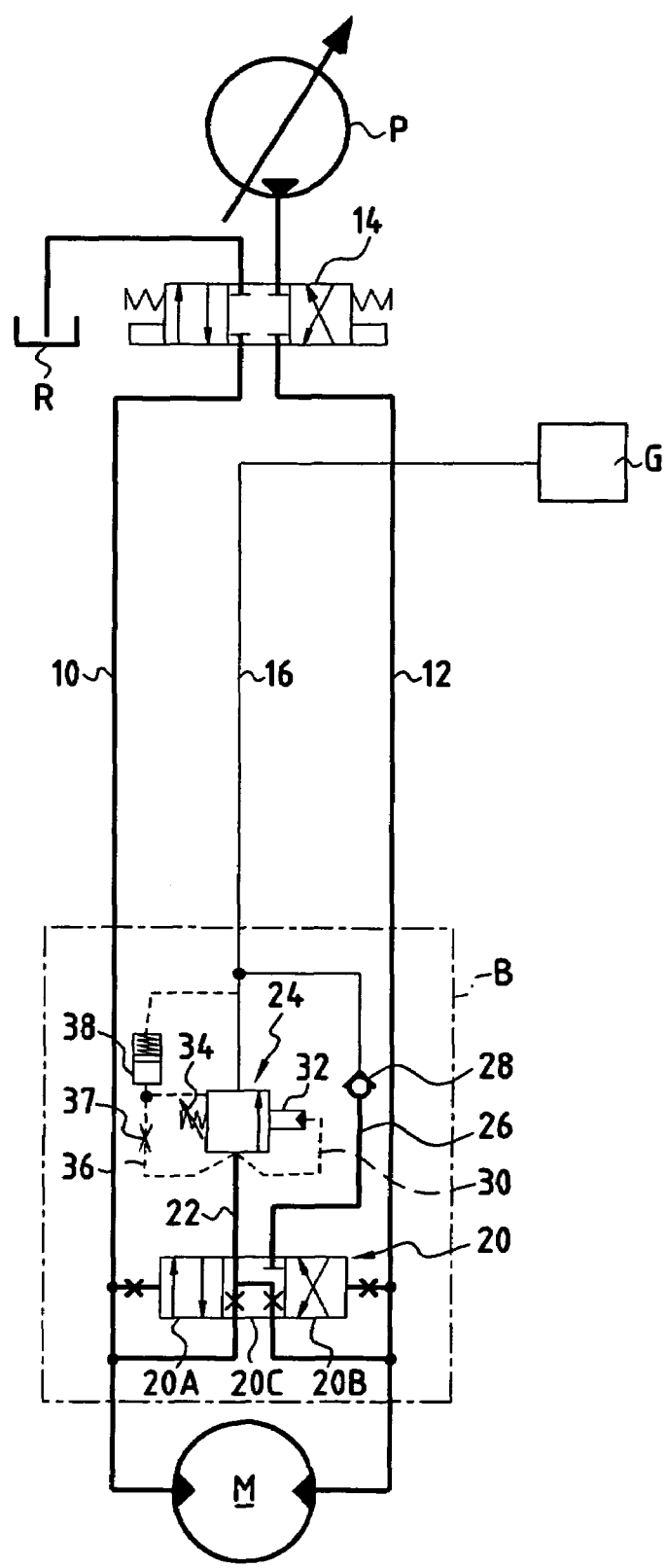

This application is a U.S.C. 371 national phase entry of PCT International Application No. PCT/FR2005/001767, filed Jul. 8, 2005, which claims priority benefit from French Patent Application No. 0407910 filed Jul. 16, 2004.

The present invention relates to an open hydraulic circuit comprising a main pump suitable for delivering a fluid under pressure, a hydraulic motor, two main ducts for feeding and for discharging said motor, a feed selector suitable for connecting the main ducts respectively to the main pump and to a reservoir without extra pressure, and for isolating said ducts from said pump and from said reservoir for the purpose of braking the motor, and booster means for boosting the discharge main duct.

The motor of such a circuit serves, in particular to drive a mass presenting high inertia. It can serve to drive a vehicle in translation or to drive a turret of a vehicle such as a hydraulic digger in rotation.

A circuit of this type is known, for example, from French Patent Application No. 2 776 032. As indicated in the above-mentioned application, the motor can be a fast motor or a slow motor. In operation, one of the main ducts is connected to the delivery orifice of a main pump and thus serves as the feed, while the other main duct is connected to a reservoir without any extra pressure and thus serves as the discharge. In order to stop the motor, the main ducts are closed off, so as to interrupt the above-mentioned connections respectively to the delivery of the pump and to the reservoir without any extra pressure.

Various constraints must be satisfied when forming a circuit of this type. Firstly, the various components of the circuit must be protected against excess pressure in the feed duct. Conventionally, as in FR 2 776 032, the circuit includes a pressure limiter for each of the main ducts, since it is possible for either one of said ducts to be the feed duct, depending on the operating conditions of the motor.

Secondly, it is important to guarantee at least a minimum pressure even in the duct that is at the lower pressure, in order to avoid cavitation phenomena. In other words, the circuit must be boosted using the above-mentioned booster means. Generally, as in FR 2 776 032, the circuit includes a booster node to which the boost fluid is brought, and which is connected to each of the two main ducts, via respective ones of two boost connections, each of which is provided with a check valve allowing fluid to flow only from the booster node to the main duct in question.

Thirdly, it is necessary, even for the discharge main duct, to limit the pressure therein. The pressure in the discharge duct can momentarily become very high. This applies in particular during braking, during which, while the main ducts are isolated, the mass continues to move under its inertia (it becomes a driving part while the motor becomes a pump), thereby generating an increase in the pressure in the discharge duct. In the circuit of FR 2 776 032, this pressure-limiting is achieved by the two above-mentioned pressure limiters.

Fourthly, it is important to limit pressure oscillations in the main ducts, when stopping the motor. As indicated above, when the ducts are closed off, the mass continues to move under its inertia, thereby generating an increase in the pressure in the main duct that was serving as the discharge prior to stopping the motor. Once the extra pressure in that main duct has reached a value that is high enough, it tends to push the mass of high inertia back in the other direction, in a return movement in the opposite direction. As indicated in FR 2 776 032, oscillations (rebounds) of the mass of high inertia then occur, and it is desirable to avoid such oscillations. For that purpose, communication needs to be established between the main ducts during the return movement of the mass of high inertia, and that is achieved in FR 2 776 032 by means of an anti-rebound valve.

Thus, in order to perform the functions necessary for accommodating the above-mentioned constraints, the FR 2 776 032 circuit includes two check valves for the boosting, two pressure limiters, and one anti-rebound valve provided with control means making it possible for the main ducts to be put momentarily into communication with each other.

An object of the invention is to propose a circuit that also performs the functions making it possible to accommodate the above-mentioned constraints, but to do so with a small number of hydraulic components.

This object is achieved by means of the fact that the circuit of the invention further comprises a multifunction valve device comprising a multifunction selector that, when the pressure in one main duct is higher than the pressure in the other main duct, is suitable for connecting the main duct in which the pressure is higher to a first auxiliary duct on which a pressure limiter is disposed, and for connecting the main duct in which the pressure is lower to the booster means, and that, when the pressures in the main ducts are substantially mutually equal, is suitable for connecting said ducts together by connecting them to said first auxiliary duct.

In operation, the multifunction selector connects the feed main duct to the pressure limiter and connects the discharge main duct to the booster means. Thus, a single pressure limiter whose outlet is connected to an enclosure external to the main circuit, and a single connection to the booster means suffice to ensure that, regardless of the direction of rotation of the motor, the functions of limiting the pressure in the high-pressure duct (protection against excessive pressure) and of boosting the pressure in the low-pressure duct (protection against cavitation) are performed. In order to limit the pressure in the discharge main duct during braking, the multifunction selector also connects that duct to the pressure limiter because said duct then becomes the main duct in which the pressure is higher, while said selector connects the other main duct to the booster means. Finally, when the pressures in the main ducts are substantially mutually equal, the selector interconnects said main ducts by connecting them to the first auxiliary duct, i.e. to the pressure limiter. This enables equal pressure to be reached more rapidly in the two main ducts so that the mass of high inertia does indeed stop.

Advantageously, when the pressures in the main ducts are substantially mutually equal, the multifunction selector is suitable for interconnecting said ducts by generating head loss between them.

This head loss is, in particular, advantageous on starting the motor since it enables the pressure to be increased in the feed main duct even if, prior to starting, the main ducts were interconnected by the multifunction selector.

Advantageously, the selector also has time-delay means for maintaining the connection between the main ducts and the first auxiliary duct for a lapse of time so that, after being substantially mutually equal, the pressures in the main ducts become different. The pressure limiter of the first auxiliary duct makes it possible, in such a situation, to remove any excess pressure.

Advantageously, the multifunction selector has two main ports connected to respective ones of the main ducts, a first functional port connected to the first auxiliary duct and a second functional port connected to a second auxiliary duct itself connected to the booster means, the multifunction selector is suitable for taking up a first end position in which the first main port is connected to the first functional port while the second main port is connected to the second functional port, a second end position in which the first main port is connected to the second functional port while the second main port is connected to the first functional port, and an intermediate position in which the two main ports are connected to the first functional port and are isolated from the second functional port, and the valve device further comprises control means for controlling the multifunction selector, which means are suitable for placing said multifunction selector in its first end position when the pressure is higher in the first main duct than in the second main duct, for placing said selector in its second end position when the pressure is higher in the second main duct than in the first main duct, and for causing said selector to pass through its intermediate position when the difference between the pressures in the main ducts changes sign.

The multifunction selector is in its first end position or in its second end position while the motor is operating, depending on the direction of rotation thereof. When the main ducts are closed off for stopping the motor, as indicated above, the pressures in the feed main duct and in the discharge main duct become inverted so that the selector passes through its intermediate position.

Advantageously, when the multifunction selector is in the intermediate position, the two main ports are connected to the first functional port via at least one constriction.

This constriction makes it possible firstly to generate the head loss between the main ducts when they are interconnected via the multifunction selector. Secondly, it prevents the pressure limiter from opening in untimely manner under the effect of the increase in the pressure in one of said ducts.

Advantageously, the circuit has time delay means for limiting the speed at which the multifunction selector goes from one to the other of its end positions.

The time delay means can be analogous to the time delay means of FR 2 776 032 and they make it possible, in particular, to maintain the selector in its intermediate position so as to keep the oscillation of the mass of high inertia under control while the motor is being stopped by isolating the main ducts.

In a first advantageous variant, the first auxiliary duct is connected to an enclosure without extra pressure.

In a second advantageous variant, the first auxiliary duct is connected to the booster means.

Figure 2:
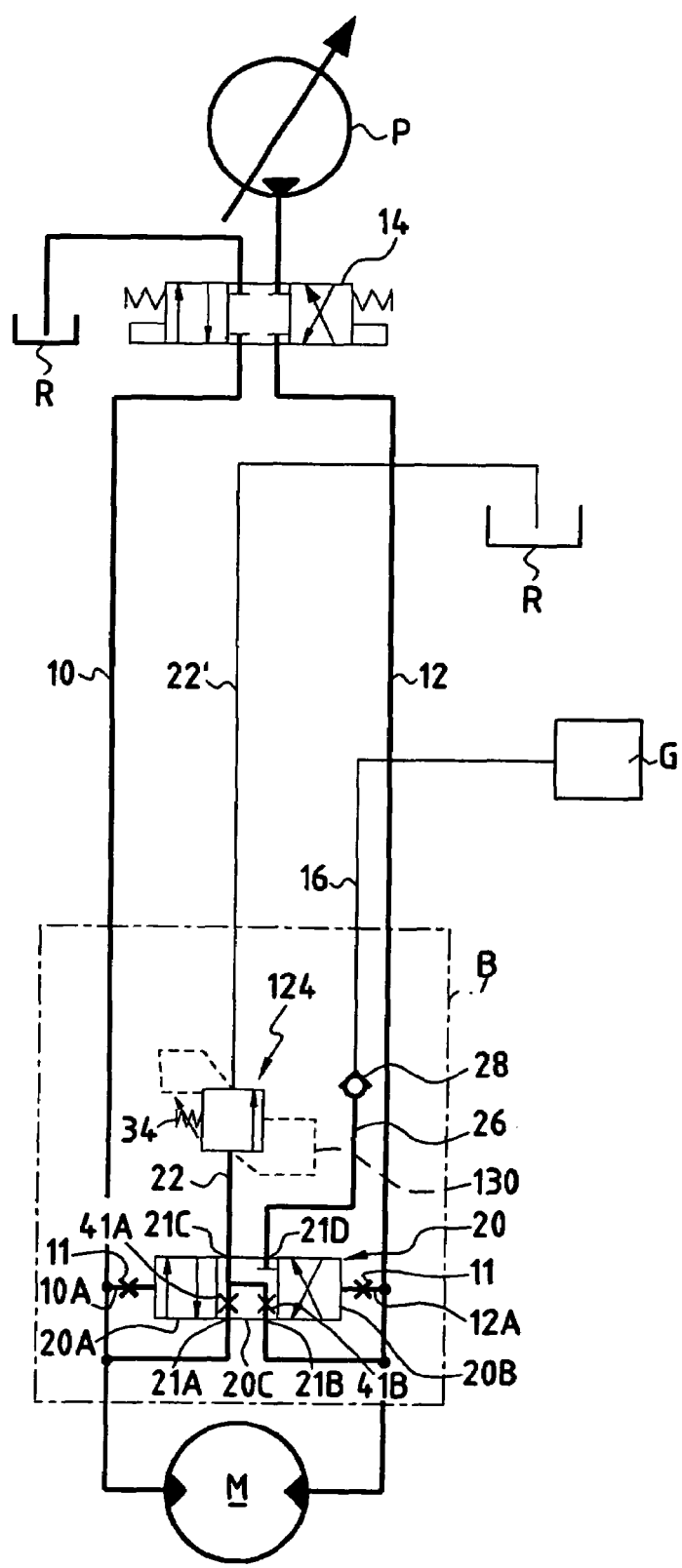
Figure 3:
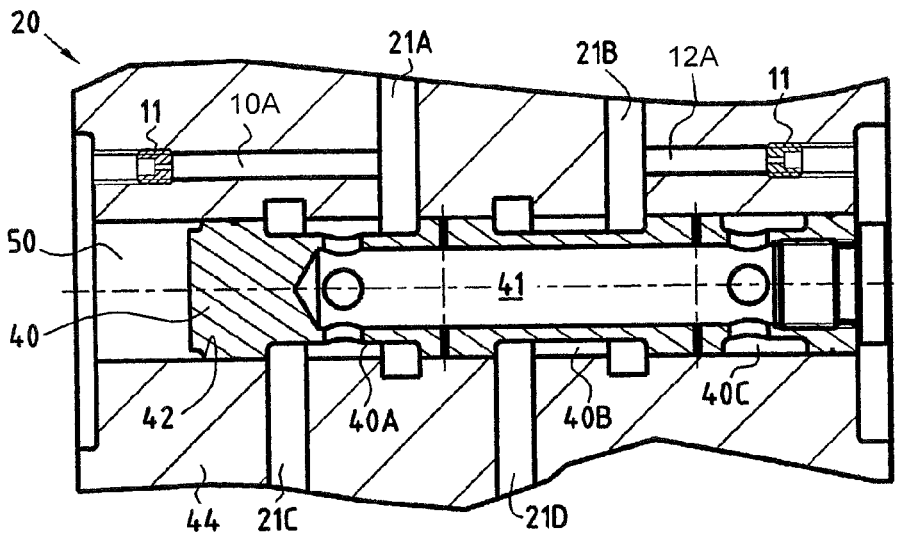
Figure 4:
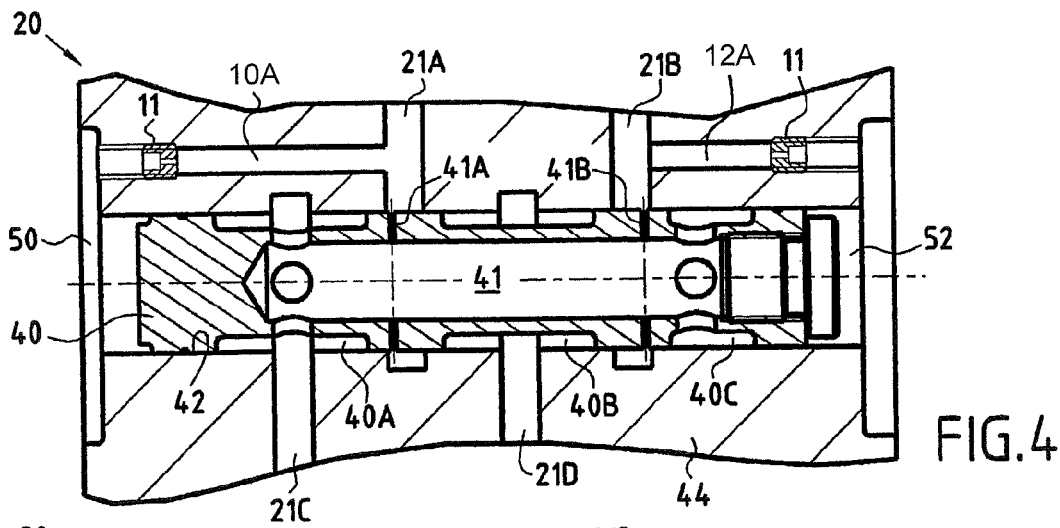
Figure 5:
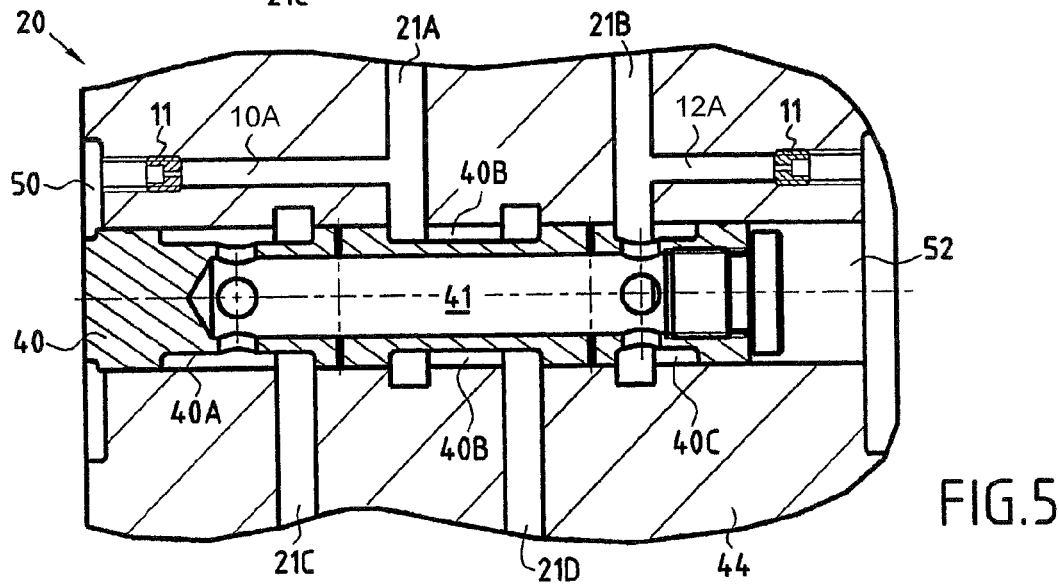

The invention can be well understood and its advantages appear more clearly on reading the following detailed description of an embodiment given by way of non-limiting example. The description refers to the accompanying drawings, in which:

FIG. 1 is a diagrammatic view of a circuit of the invention;
FIG. 2 is a diagrammatic view of a variant of a circuit of the invention; and
FIGS. 3 to 5 are diagrammatic section views of a multifunction selector of the invention, respectively showing said selector in its first end position, in its intermediate position, and in its second end position.

The circuit shown in FIG. 1 includes a main pump P operating in one direction only, the circuit being of the open type. It also includes two main ducts, respectively 10 and 12, which, depending on the position of a feed selector 14, can be connected one (10 or 12) to the delivery orifice of the pump P and the other (12 or 10) to a reservoir R at atmospheric pressure. When, as shown in FIG. 1, the feed selector 14 is in its central position, both of the two ducts 10 and 12 are closed off, i.e. they are isolated both from the delivery orifice of the pump P and from the reservoir R.

The circuit also includes booster means G of any suitable type. Said booster means can in particular be constituted a booster secondary pump such as the pump 110 of FR 2 776 032. They can also be constituted by a duct or by an enclosure connected to the delivery orifice of the main pump P via connection means that maintain, in said duct or in said enclosure, a boost pressure that is sufficient but that is lower than the maximum delivery pressure of the pump. The booster means can also be constituted by a control circuit, e.g. for controlling the brake, which control circuit is connected to a boost duct 16. In any event, said booster means deliver a boost pressure into a boost duct 16.

The circuit also includes a multifunction valve device comprising a multifunction selector 20 having three positions.

In its first end position 20A that it takes up when the pressure in the first main duct 10 is higher than the pressure in the second main duct 12, said multifunction selector connects the first main duct 10 to a first auxiliary duct 22 on which a pressure limiter 24 is disposed, and connects the second main duct 12 to a second auxiliary duct 26 which is itself connected to the boost duct 16 via a check valve 28 disposed on said second auxiliary duct 26.

When the multifunction selector 20 takes up its second end position 20B, when the pressure in the main duct 12 is higher than the pressure in the main duct 10, i.e. it is the duct 12 that is connected to the first auxiliary duct 22, while the duct 10 is connected to the second auxiliary duct 26.

When the pressures in the main ducts 10 and 12 are substantially equal, the multifunction selector 20 takes up its intermediate position 20C in which the two main ducts 10 and 12 are interconnected via a constriction (constrictions 41A, 41B) and are also connected to the first auxiliary duct 22, while the second auxiliary duct 26 is isolated.

In this example, both the first auxiliary duct 22 and the second auxiliary duct 26 are connected to the boost duct 16, respectively downstream from the pressure limiter 24 and upstream from the check valve 28, and the pressure limiter thus removes the fluid towards the check valve 28, thereby limiting the flow-rate needs of the booster device.

In FIG. 1, the pressure limiter 24 is of the "damped" type, i.e. it is jolt-free. It is caused to open in a special manner. More particularly, control means for controlling said limiter 24 cause it to open in two stages, with damping opening when the pressure in the first auxiliary duct 22 reaches a first threshold pressure and pressure-limiting opening when said pressure reaches a pressure-limiting threshold that is greater than the first threshold.

The pressure limiter serves to prevent the pressure in the first auxiliary duct 22 exceeding the pressure-limiting threshold. However, conventional control means for causing the pressure limiter to open when said pressure threshold is reached actually generate a pressure shock on opening the limiter.

The moving member of a conventional pressure limiter is indeed urged to move at the pressure-limiting threshold, but, due to the inertia of said moving member, opening is complete only after a certain lapse of time, during which the pressure in the first auxiliary duct increases. Then, the pressure is stabilized, and it returns to the pressure-limiting threshold. Damping opening as of the first threshold pressure makes it possible to avoid that type of phenomenon.

In this example, the control means for controlling the pressure limiter comprise a control duct 30 feeding a control chamber 32 formed such that an increase in pressure in said chamber urges the moving member of the limiter 24 to move in the opening direction, against the return drive from a return spring 34. Said control means further comprise a counter-control duct 36 on which a constriction 37 is disposed and which feeds a time delay chamber 38 that is disposed such that the pressure in the chamber 38 urges the moving member of the limiter 24 to return in the closure direction, in addition to the drive exerted on said moving member by the spring 34.

Starting from a situation in which the pressure in the first auxiliary duct 22 is lower than the threshold pressure, the pressure limiter 24 operates as follows when the pressure in the duct 22 increases.

Since the control duct 30 is connected to the duct 22, the pressure in the control chamber 32 increases to reach the first threshold pressure determined by the rating of the spring 34. At that time, since no backpressure is exerted by the fluid present in the chamber 38, the selector 24 opens. However, when the pressure in the duct 22 continues to increase, said duct 22 feeds the chamber 38 via the duct 36. The pressure in the chamber 38 then increases in a manner such as to be added to the drive exerted by the spring 34 so as to tend to re-close the limiter 24, and it is thus necessary for the pressure in the duct 30 to become equal to the pressure-limiting threshold in order to keep the limiter 24 open.

The above-mentioned inertia effect no longer exists or hardly exists any more because the pressure limiter opens as soon as the first threshold pressure is obtained in the duct 22.

The elements of the circuit in FIG. 2 that are identical to the FIG. 1 elements are given like references. In particular, the multifunction selector 20 is unchanged. Unlike in FIG. 1, the auxiliary ducts 22 and 26 of the FIG. 2 circuit are not interconnected. The second auxiliary duct 26 is connected to the boost duct 16 via a check valve 28, but the first auxiliary duct 22 is connected to a pressure-free reservoir R downstream from the pressure limiter 124 for a duct 22'.

Although it is advantageous for the auxiliary ducts to be connected to a low-pressure auxiliary source as in FIG. 1, in which said source is constituted by the booster means, it is not essential for enabling the circuit to operate properly. In particular, the pressure-limiting function of the limiter 124 can be achieved by connecting the duct 22 to the reservoir R, or to any other enclosure at atmospheric pressure or at a low pressure. The control means for controlling the pressure limiter 124 are conventional, and they comprise a control duct 130 connected to the duct 22 so that an increase in pressure in said control duct 130 in excess of the limitation threshold set by the rating of the return spring 34 causes the pressure limiter 124 to open.

FIGS. 1 and 2 show that the multifunction selector 20 has two main ports, respectively 21A and 21B, each of which is connected to a respective one of the main ducts 10 and 12. A first functional port 21C is connected to the first main duct 22 and a second functional port 21D is connected to the second auxiliary duct 26 that is connected to the booster means G.

The configuration of the selector is shown in more detail in FIGS. 3 to 5. It can be seen that it comprises a slide 40 mounted to move in a bore 42 which is provided in a body 44 and into which the two main ports 21A and 21B and the two functional ports 21C and 21D open out. In FIG. 3, the selector (and more precisely its slide 40) is in its first end position, in which the first main port 21A is connected to the first functional port 21C in order to interconnect the first main duct 10 and the auxiliary main duct 22, while the second main duct 21B is connected to the second functional port 21D in order to interconnect the second main duct 12 and the second auxiliary duct 26. This position is the position 20A indicated in FIGS. 1 and 2.

In FIG. 4, the selector is in its intermediate position, the ports 21A, 21B, and 21C being interconnected while the port 21D is isolated from the other ports.

In FIG. 5, the selector is in its second end position 20B, with the ports 21A and 2D being interconnected while the ports 21B and 21C are interconnected.

In the end positions 20A and 20B, the ports that are interconnected in each pair are isolated from the other ports.

FIGS. 1 and 2 show that the multifunction selector 20 has control means that comprise a first control duct 10A connected to the first main duct 10, and a second control duct 12A connected to the second main duct 12. It can be seen that constrictions 11 are disposed on said control ducts. Said constrictions form time delay means that limit the speed at which the selector 20 goes over from one to the other of its end positions 20A and 20B.

FIGS. 3 to 5 show that the control means comprise respectively a first control chamber and a second control chamber, respectively 50 and 52, each of which chambers is situated at a respective end of the bore 42. The first control chamber 50 is connected to the first port 21A via a control duct 50A while the second control chamber 52 is connected to the second port 21B via a second control duct 12a. The constrictions 11 are disposed in said ducts 10A and 12A.

It is recalled that, when the selector is in place in the circuit, the ports 21A and 21B are connected to respective ones of the main ducts 10 and 12. Thus, connections of the control ducts 10A and 12A to respective ones of the ports 21A and 21B form respective ones of the control ducts 10A and 12A shown in FIGS. 1 and 2;

It can be seen that, when the slide is in the first end position as shown in FIG. 3, in which position the pressure in the first control chamber 50 is higher than the pressure in the second control chamber 52, a first connection interconnects the first main duct 21A and the first functional port 21C while a second connection interconnects the second main port 21B and the second functional port 21D. In this example, the first and second connections are formed respectively by a first groove 40A and by a second groove 40B, which grooves are provided in the outside surface of the slide 40. In the first end position shown in FIG. 3, the first and second connections are isolated from each other.

When the slide is in the second end position as shown in FIG. 5, the pressure in the second control chamber 52 is higher than the pressure in the first control chamber 50, and the second connection (groove 40B) interconnects the first main port 21A and the second functional port 21D, while the second main port 21B and the first functional port 21C are interconnected via an additional connection. In this example, said additional connection comprises a borehole 41 through the slide that opens out at one end into the first groove 40A and at its other end into a third groove 40C in the surface of the slide. When the slide is in the second end position, the groove 40B extends between the ports 21A and 21D while the groove 40A is in register with the port 21C and while the groove 40C is in register with the port 21B. Naturally, in this second end position, the second connection (groove 40B) and the additional connection are isolated from each other.

In FIG. 4, the slide 40 is shown in its intermediate position, the pressures in the control chambers 50 and 52 being substantially equal. In this situation, the first and second main ports 21A and 21B, and the first functional port 21C are interconnected via intermediate connection means which comprise the above-mentioned additional connection. More precisely, said intermediate connection means comprise communication orifices 41A and 41B for establishing communication between the borehole 41 through the slide and the outside surface thereof. Said orifices are implemented in the form of constrictions and are disposed in register respectively with the first main port 21A and with the second main port 21B when the slide 40 is in its intermediate position.

In order to start the motor, the feed selector 14 is placed in either one of its end positions. For example, it is placed in its position shown on the right of the circuits of FIGS. 1 and 2 so that the main duct 10 serves as the feed and the main duct 12 serves as the discharge. The pressure then increases in the main duct 10 even if the multifunction selector 20 is initially in its intermediate position 20C because, in that position, head loss is generated between the main ducts that communicate with each other (constrictions 41A and 41B of the slide 41. The selector 20 is thus placed in its first end position 20A and it connects the first main duct 10 to the pressure limiter 24 and the second main duct 12 to the booster means G. The mass of high inertia is then driven in a first operating direction.

In order to slow down the mass of high inertia suddenly or to stop it, the feed distributor 14 is disposed in its central position in which the main ducts 10 and 12 are isolated from the pump P and from the reservoir R. Since the mass of high inertia continues to move in the first direction, the pressure increases suddenly in the discharge main duct 12. As a result, the multifunction selector 20 goes into its second end position 20B by passing through its intermediate position 20C. As it passes through the intermediate position 20C, an excessive pressure peak in the duct 12 which is momentarily at the higher pressure is avoided because said duct is connected to the pressure limiter 24, and cavitation in the duct 10 that is momentarily at the lower pressure is also avoided due to said duct 10 being connected to the duct 12 because the ports 21A and 21B of the multifunction selector are communicating.

The mass of high inertia continues to move in the first direction and the pressure in the duct 12 thus continues to increase. As a result, the selector 20 reaches its second end position 20B, in which the duct 12 is durably connected to the pressure limiter 24, while the duct 10 is connected to the booster means. The pressure in the duct 12 increases due to the movement of the mass of high inertia, and also due to heating that can take place. Any surplus volume of fluid in said duct is thus removed due to the fact that the pressure limiter 24 is opened, while cavitation is avoided by the boosting of the duct 10.

Furthermore, the constrictions 11 that are situated on the control ducts 10A and 12A have, for a certain amount of time, maintained the selector 20 in its position 20C, making it possible to cause the ducts 10 and 12 to communicate. Rebound and oscillation phenomenon are thus limited. In particular, when the pressure in the duct 12 has reached a value that is sufficiently high, the mass of high inertia can be driven in the other direction, then producing an increase in the pressure in the duct 10. As result, the selector 20 moves once again towards its first end position 20A, but by passing through its intermediate position 20, in which it is held for a certain lapse of time due to the constrictions 11. In general, said lapse of time is sufficient for the pressure in the ducts 10 and 12 to be limited without the mass of high inertia starting to oscillate again for another oscillation stage.

The multifunction valve device comprises the multifunction selector 20, the pressure limiter 24, and the check valve 28, with the main ports and the functional ports being disposed appropriately.

Advantageously, the above-mentioned components (selector 20, limiter 24, and check valve 28) are disposed in the same valve unit B constituting the multifunction valve device, or are integrated into the motor M.

The invention claimed is:

1. An open hydraulic circuit comprising a main pump suitable for delivering a fluid under pressure, a hydraulic motor, two main ducts for feeding and for discharging said motor, a feed selector suitable for connecting the main ducts respectively to the main pump and to a reservoir without extra pressure, and for isolating said ducts from said pump and from said reservoir for the purpose of braking the motor, and booster means for boosting the discharge main duct,
   a multifunction valve device comprising a multifunction selector that, when the pressure in one main duct is higher than the pressure in the other main duct, is suitable for connecting the main duct in which the pressure is higher to a first auxiliary duct on which a pressure limiter is disposed, and for connecting the main duct in which the pressure is lower to the booster means, and that, when the pressures in the main ducts are substantially mutually equal, is suitable for connecting said ducts together by connecting them to said first auxiliary duct.

2. A circuit according to claim 1, wherein, when the pressures in the main ducts are substantially mutually equal, the multifunction selector is suitable for interconnecting said ducts by generating head loss between them.

3. A circuit according to claim 1, wherein the multifunction selector has two main ports connected to respective ones of the main ducts, a first functional port connected to the first auxiliary duct and a second functional port connected to a second auxiliary duct itself connected to the booster means, wherein the multifunction selector is suitable for taking up a first end position in which the first main port is connected to the first functional port while the second main port is connected to the second functional port, a second end position in which the first main port is connected to the second functional port while the second main port is connected to the first functional port, and an intermediate position in which the two main ports are connected to the first functional port and are isolated from the second functional port, and wherein the valve device further comprises control means for controlling the multifunction selector, which means are suitable for placing said multifunction selector in its first end position when the pressure is higher in the first main duct than in the second main duct, for placing said selector in its second end position when the pressure is higher in the second main duct than in the first main duct, and for causing said selector to pass through its intermediate position when the difference between the pressures in the main ducts changes sign.

4. A circuit according to claim 2, wherein the multifunction selector has two main ports connected to respective ones of the main ducts, a first functional port connected to the first auxiliary duct and a second functional port connected to a second auxiliary duct itself connected to the booster means, wherein the multifunction selector is suitable for taking up a first end position in which the first main port is connected to the first functional port while the second main port is connected to the second functional port, a second end position in which the first main port is connected to the second functional port while the second main port is connected to the first functional port, and an intermediate position in which the two main ports are connected to the first functional port and are isolated from the second functional port, and wherein the valve device further comprises control means for controlling the multifunction selector, which means are suitable for placing said multifunction selector in its first end position when the pressure is higher in the first main duct than in the second main duct, for placing said selector in its second end position when the pressure is higher in the second main duct than in the first main duct, and for causing said selector to pass through its intermediate position when the difference between the pressures in the main ducts changes sign.

5. A circuit according to claim 3, wherein, when the multifunction selector is in the intermediate position, the two main ports are connected to the first functional port via at least one constriction.

6. A circuit according to claim 3, wherein the control means comprise first and second control ducts connected to respective ones of the first and second main ducts.

7. A circuit according to claim 3, having time delay means for limiting the speed at which the multifunction selector goes from one to the other of its end positions.

8. A circuit according to claim 6, having time delay means for limiting the speed at which the multifunction selector goes from one to the other of its end positions.

9. A circuit according to claim 8, wherein the time delay means comprise constrictions in the control ducts are equipped with constrictions.

10. A circuit according to claim 1, wherein the first auxiliary duct is connected to an enclosure without extra pressure.

11. A circuit according to claim 1, wherein the first auxiliary duct is connected to the booster means.

12. A circuit according to claim 1, further comprising control means for controlling the pressure limiter, which control means are suitable for causing said limiter to open in two stages, with damping opening when the pressure in the first auxiliary duct reaches a first threshold pressure, and pressure-limiting opening when said pressure reaches a pressure-limiting threshold that is higher than said first threshold.

13. A multifunction selector intended for a circuit according to claim 1, said multifunction selector having two main ports suitable for being connected to respective ones of the main ducts, a first functional port suitable for being connected to the first auxiliary duct and a second functional port suitable for being connected to a second auxiliary duct, and being suitable for taking up a first end position in which the first main duct is connected to the first functional port while the second main duct is connected to the second functional duct, a second end position in which the first main duct is connected to the second functional port while the second main port is connected to the first functional port, and an intermediate position in which the two main ducts are connected to the first functional port and are isolated from the second functional port.

14. A selector according to claim 13, having at least one constriction, disposed on the connection between the first functional port and the two main ports when said selector is in the intermediate position.

15. A selector according to claim 13, having a slide mounted to move in a bore which is provided in a body and into which said main and functional ports open out, and control means for causing the body to move, which means comprise first and second control chambers situated at respective ends of the bore and connected respectively to the first main duct and to the second main duct, via respective ones of first and second control ducts provided in the body, and wherein:

when the slide is in a first end position in which the pressure in the first control chamber is higher than the pressure in the second control chamber, a first connection interconnects the first main port and the first functional port, while a second connection interconnects the second main port and the second functional port;

when the slide is in a second end position in which the pressure in the second control chamber is higher than the pressure in the first control chamber, the second connection interconnects the first main port and the second operational port, while the second main port and the first operational port are interconnected via an additional connection; and when the slide is in an intermediate position, the first and second main ports and the first functional port are interconnected by intermediate connection means including said additional connection.

16. A selector according to claim 15, wherein the additional connection comprises a borehole through the slide and the additional connection means comprise communication orifices for establishing communication between said borehole and the outside surface of the slide, said orifices being in the form of constrictions and being disposed in register with respective ones of the first and second main ports when the slide is in its intermediate position.

* * * * *